United States Patent [19]
Dunn et al.

[11] Patent Number: 5,448,915
[45] Date of Patent: Sep. 12, 1995

[54] METHOD FOR IMPROVING THE ACCURACY OF ULTRASONIC THICKNESS MEASUREMENTS BY CALIBRATING FOR SURFACE FINISH

[75] Inventors: Dan Dunn, Bethal, Conn.; Eugene Waldenmaier, White Planes, N.Y.

[73] Assignee: Hughes Aircraft Company, Los Angeles, Calif.

[21] Appl. No.: 116,157

[22] Filed: Sep. 2, 1993

[51] Int. Cl.⁶ ............................................. G01N 29/00
[52] U.S. Cl. .................................... 73/597; 73/615
[58] Field of Search ................. 73/597, 615, 610, 612, 73/627

[56] References Cited

U.S. PATENT DOCUMENTS

| | | | |
|---|---|---|---|
| 4,182,155 | 1/1980 | Fowler | 73/597 |
| 4,437,332 | 3/1984 | Pittaro | 73/615 |
| 4,800,757 | 1/1989 | Hashinoki et al. | 73/597 |
| 5,038,615 | 8/1991 | Trulson et al. | 73/597 |
| 5,062,298 | 11/1991 | Falcoff et al. | 73/597 |
| 5,201,225 | 4/1993 | Takahashi et al. | 73/615 |

*Primary Examiner*—Hezron E. Williams
*Assistant Examiner*—Helen C. Kwok
*Attorney, Agent, or Firm*—W. C. Schubert; W. K. Denson-Low

[57] ABSTRACT

The invention provides a method for measuring thickness of sample of material having a surface finish in a time of flight system using an ultrasonic thickness gauge, comprising the steps of: defining the time of flight system as a function of $t' = h' \div Va' + C(f)$ where $t'$ is the time of flight of an ultrasonic wave though the calibration sample, $h'$ is a mechanically measured thickness of the calibration material, $Va'$ is one half the velocity of sound through the material, and $C(f)$ is a surface finish dependent time offset calibrated for the finish of the near and far side surfaces; passing an actual wave with the velocity of $2Va$ through the sample; measuring the time of flight ($t$) of the actual ultrasonic wave though the sample; providing the surface finish dependent time offset calibrated for the finish of each surface of the material; and establishing a corrected thickness measurement (CTM) as a function of the surface finish dependent offset ($C(f)$) which satisfies the condition $CTM = Va \times (t - C(f))$.

8 Claims, 2 Drawing Sheets

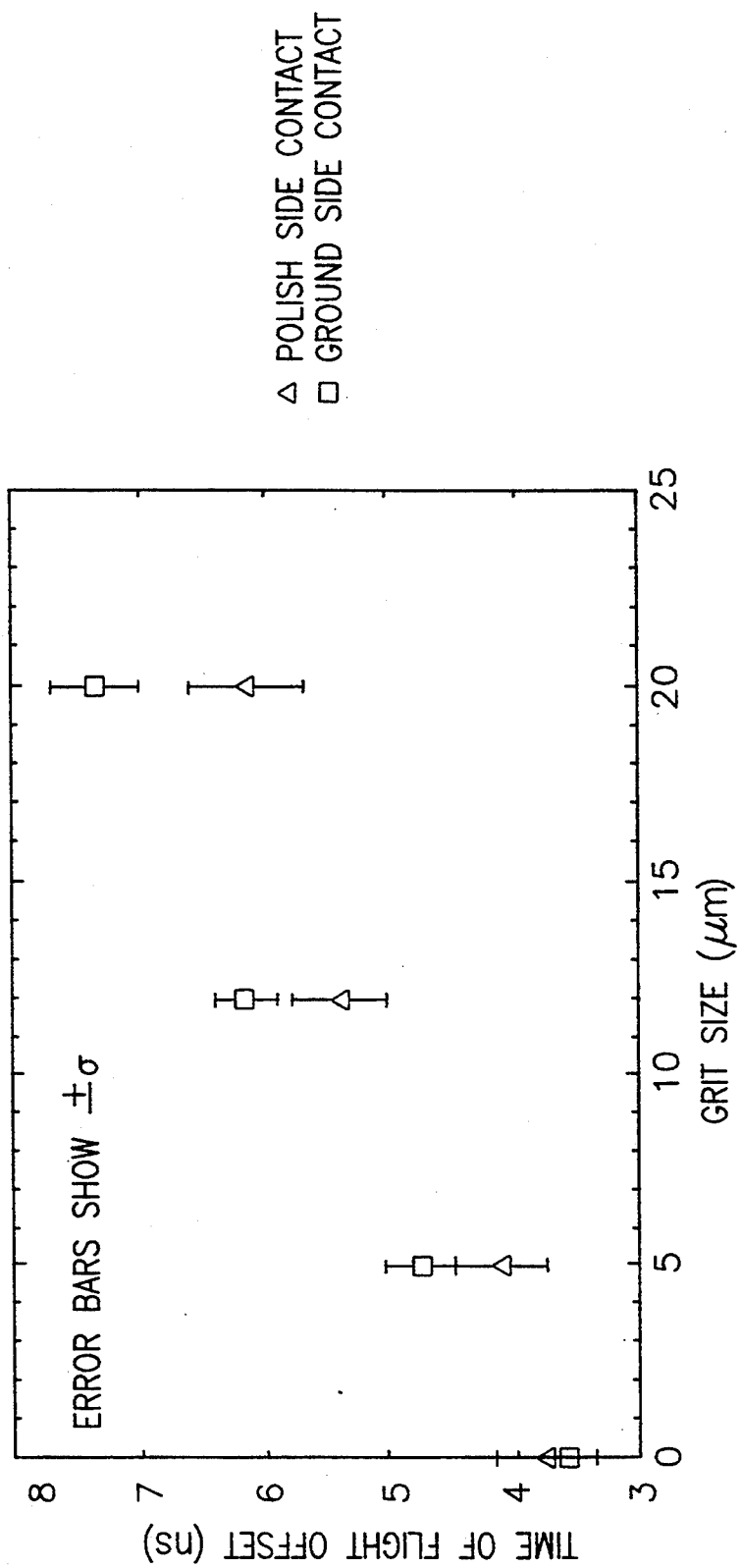

METHOD FOR IMPROVING THE ACCURACY OF ULTRASONIC THICKNESS MEASUREMENTS BY CALIBRATING FOR SURFACE FINISH

The invention described herein was made in the performance of work under NASA Contract Number 959020 and is subject to the provisions of section 305 of the National Aeronautic and Space Act of 1958 (72 Stat. 435; 42 U.S.C. 2457).

BACKGROUND OF THE INVENTION

1. Field of the Invention

The present invention generally relates to a method for measuring thickness of material by ultrasound and, in particular, relates to a method for improving the correlation between "Ultrasonic measurements" and "mechanical measurements" by a priori knowledge of surface roughness.

2. Description of the Prior Art

An ultrasonic thickness gauge (UTG) is used to measure the thickness of materials such as metal, ceramics and glass by the time measurement of the temporal delay between two reflected acoustic pulses which emitted from a common source, where the first pulse is the reflection from the first (or near side) surface and the second pulse is the reflection from the second (or far side) surface.

The electronics which executes a single instrument reading can be visualized to have four basic functions: the pulse generator that initiates the sonic pulse; the delay circuits that time aperture a detection circuit; the echo pulse detection circuits that initiate and terminate a pulse counter; and an independent clock that generates the pulses that are summed by the counter. Nominally a 10 nanosecond (ns) clock is used.

Since the "pulse generator and detection circuit and counter and clock" are asynchronous, the number of 10 ns pulses summed within a fixed detection window will vary by ±0.5 pulses even in an ideal noise-free environment.

Since the time variance of ±0.5 pulses is random, the variance of the reported reading is correctly reduced by an average of many samples which constitutes a single reading. Thus variance of the averaged value is now reduced by the square root of the number of "n", where "n" is the number of samples in a single reading. It should be noted, that if "n" is properly selected such that the variance of the readings is larger than the quantization of the instrument, subsequent averaging of the readings may reduce the variance of the reported measurement (time or thickness) by the square root of "m", where "m" is the number of readings that are averaged in the reported measurement.

Empirical data acquired by the inventors have demonstrated that the variance of many successive measurements does follow the common statistical laws where the standard deviation of a measurement ($\sigma_m$) is equal to the standard deviation of a sample ($\sigma_s$), reduced by the square root of the number of samples in that measurement (m×n), that is:

$$\sigma_m = \frac{\sigma_s}{\sqrt{m \times n}} \quad (1)$$

However, in the averaging of this large number of samples, the true window will be reported with a negative 0.5 pulse bias (that is −5 ns for a 10 ns clock).

The time between the first and second pulse is assumed to be the total distance traveled divided by the velocity of the acoustic pulse in the media that is being measured. The thickness is then assumed to be ½ the increased distance that the second reflected sound pulse traveled relative to the first reflected sound pulse since the second reflected pulse passed though the media twice in addition to the identical paths of the first reflected pulse. Thus:

(2) time between pulses=differential distance/velocity=(thickness)(2)/velocity, and (3) Thickness=½ (time)(velocity)=(time)(½ velocity)=(time)(Va), where:

time=the measured elapsed time (here after referred to as time of flight), and

Va=one half of the temperature corrected sonic velocity of the sample (material or media).

It should be noted that the above equations do not account for any affect that are correlated to, or a function of, surface preparation or surface roughness and it should be noted that the equation does not account for any time bias.

Likewise, experience states that the surface finish of measured material are usually not the same, i.e. a glass sample that is rough ground and later when it is polished, or a plate steel that is rough milled versus ground or polished.

Accordingly, one disadvantage of the previous technology is that the UTG system does not measure the true elapsed time between two pulses (hence thickness of a sample when the true sonic velocity is used in the computations). Likewise, another disadvantage is that the change in a sample's thickness is incorrect when the surface roughness was altered between the two comparative measurements. That is, if the UTG were used as an in-process monitoring device to determine material removal as the surface finish were altered, the subsequent absolute mechanical measurements would not agree.

SUMMARY OF THE INVENTION

Accordingly, one objective of the present invention is to correct the ultrasonic thickness measurements by the correction for: any systematic measurement bias from averaged samples (readings), the calibration correction for the correlation of offsets as a function of surface roughness or method of surface preparation for each surface (near side and far side), and the type sample (material or media) measured.

This objective is accomplished, at least in part, by measuring the thickness of many uniquely identified samples by both mechanical techniques and by UTG's elapsed time between sound pulses reflected from the two surfaces of each sample. These UTG elapsed time measurements include measurements where each surface is reversed (front to rear). These samples are subsequently processed to change the surface conditions and then the measurement process is repeated. This procedure continues until sufficient data is acquired to establish a valid correlation between the variables that are to be quantified. It should be noted that the sonic velocity of material is very strongly influenced by temperature. Thus, the sample's temperature is also recorded during each measurement.

It also should be noted that investigators established the change in sonic velocity as a function of temperature by statistical reduction of data where the only variable was the temperature for numerous samples of the interested media.

The objective is further accomplished by defining the elapsed time between the two pulses as a function of the equation:

$$(4) \quad t' = h' \div Va' + C(f),$$

wherein
- $t'$ = the measured time of flight of the calibration sample,
- $h'$ = the mechanically measured thickness of the calibration sample (material or media),
- $Va'$ = one half of the temperature corrected sonic velocity of the calibration sample (material or media), and
- $C(f)$ = the surface finish dependent time offset (Correction is required to establish the correlation for all values of ($h'$) and ($t'$) as a function of surface conditions. These values include any time measurement bias from the measurement clock and the function of roughness for each surface or the method or process or operation that prepared each surface).

Thus the corrected thickness measurement (CTM) for a measured time of flight of "t" as a function of surface finish dependent time offset (C(f)) is satisfied by the equation:

$$(5) \quad CTM = Va \times (t - C(f)),$$

wherein
- $t$ = the measured time of flight,
- $Va$ = one half of the temperature corrected sonic velocity of the sample (material or media), and
- $C(f)$ = the surface finish dependent time offset previously discussed in equation (4).

Other objects and advantages of the present invention will become apparent to those skilled in the art from the following detailed description of the invention when read in conjunction with the appended claims and drawings attached hereto.

DESCRIPTION OF THE DRAWING

FIG. 3 is a graph of the mechanical equivalent of the time offsets.

DETAILED DESCRIPTION OF THE INVENTION

The present invention provides a method for measuring thickness of a sample of material having a surface finish in a time of flight system, comprising of the steps of:

defining the time of flight system as a function of the equation $$(6) \quad t' = h' \div Va' + C(f),$$

wherein

- $t'$ = the time of flight (TOF) of an ultrasonic wave through the material of the calibration sample,
- $h'$ = the mechanically measured thickness of the calibration sample (material or media),
- $Va'$ = one half of the temperature corrected velocity of sound in the calibration sample (material or media),
- $C(f)$ = the surface finish dependent time offset, calibrated to establish the precise correlation for all values of ($h'$) and ($t'$) as a function of surface conditions. (These values include any time measurement bias from the measurement clock and the function of roughness for each surface or the method or process or operation that prepared each surface.); passing an actual ultrasonic wave with the velocity of sound ($2 \times Va$) through the sample; measuring the actual time of flight (t) of the actual ultrasonic wave through the sample; providing surface finish dependent time offset (C(f)) calibrated for the material and the surface finish of the material; and establishing a corrected thickness measurement (CTM) as a function of surface finish dependent time offset (C(f)), which satisfies the condition:

$$(7) \quad CTM = Va \times (t - C(f)).$$

Figure 1:
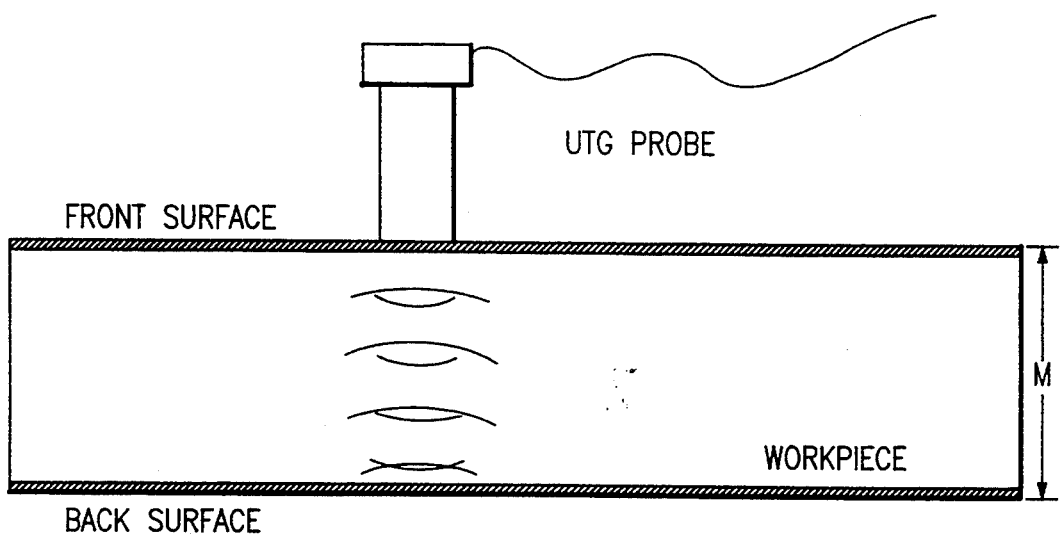
FIG. 1 shows a UTG probe in contact with a front surface of a workpiece with a thickness "M" and a rear surface.

FIG. 1 shows the time of flight system having the UTG for measuring the thickness of the material "M".

Time of Flight Correction

For the purpose of discussing the invention, it will be assumed that the time of flight (TOF) is a linear function for the thickness of the undamaged layer plus a certain time to traverse the front surface (dependent upon the condition of its surface) and a certain time to reflect off of a rear surface (also dependent upon the condition of its surface). Mechanical thickness is assumed to be a similar function of the undamaged bulk layer plus two surface condition dependent layers. Given this, $$(8) \quad C(f) = \text{front offset} + \text{rear offset, and}$$

$$(9) \quad TOF = h + Va + \text{front offset} + \text{rear offset},$$

where
the offsets are in units of time and nothing about their sign is usually assumed, "Corrected Thickness" can be read as "Mechanical Thickness", and the measurement of this time of flight (TOF) may have a systematic bias, and

(10) Corrected Thickness = $(Va) \times ((TOF - \text{front offset}) - \text{rear offset})$.

EXPERIMENT

Five disks of Zerodur ™ (Zerodur is a trademark of Schott Corporation) were fabricated from the same melt, with thicknesses varying from 0.9 inch to 0.5 inch. One side of each was polished, and designated surface R1. The other side of each was ground with a 30 $\mu m$ (nominal) slurry and designated R2. The surfaces were nominally parallel.

The mechanical thickness of each sample was measured five times using a surface plate, Vernier height gauge and amplifier, and a height indicator standard. The thickness was measured at the approximate center and at four sites approximately $\frac{1}{4}$ inch from the center and equally spaced. These data points are recorded.

The acoustic thickness of each sample was then measured three times with a known UTG device, such as a Krautkrammer-Branson CL304 ultrasonic thickness gauge. The set-up of the instrument are known in the art and are well documented by the suppliers of these instruments (such as Krautkrammer-Branson).

A known thermocouple system was used to monitor the temperature of the samples. Once the temperature reached a steady state for ten minutes, a UTG probe was applied to the surface and 20 readings (where each reading is an average of 1000 samples) were taken and input into a computer as a single measurement. The average thickness was computed and recorded, along with the temperature. The process was immediately repeated with the probe contacting the opposite side. This process was repeated 3 times to acquire the 3 measurement per surface, per sample for the 5 samples uniquely prepared by the following process.

The surface finish prepared with 30 $\mu$m (nominal) grit slurry was then reworked with a surface finish prepared with 20 $\mu$m (nominal) grit slurry, while ensuring a thickness of at least 3 times the previous nominal grit size was removed with each grit size of the samples. The mechanical and acoustic measurements were then repeated. This process was repeated with samples having surface finishes prepared with 12 $\mu$m (nominal) grit slurry, then with 5 $\mu$m (nominal) grit slurry, and then polished. Hence, the final 5 samples had both surfaces polished.

ANALYSIS

Data Manipulation

The ASYST computer program was used to analyze the data. The thicknesses returned by the Krautkramer Branson CL304 were divided by the acoustic velocity supplied to the instrument, then doubled to account for the round trip path of the acoustic pulse, to arrive at the raw time of flight measured by the UTG. All data were corrected to a standard temperature equivalent of 70° F., using a previously determined value for the thermal coefficient of acoustic velocity for Zerodur TM, 0.554 m/sec. ° F.

Linear regression analysis was performed on the data, using the mechanical measurements as the independent variable, and acoustic time of flight as the dependent variable. The best fit slopes obtained then correspond to the acoustic velocity through bulk Zerodur TM at 70° F., while the intercept corresponds to the timing offset, which comprises all surface finish dependent and instrument bias terms.

Analysis of the data at this point indicated that some data were discrepant. These data were eliminated or, if it was clear that a certain error occurred (e.g. by misreading the gauge), the data was adjusted to account for the error.

The following table summarizes the amount of material removed, measured mechanically, from each of the five samples studied in each of the following phases of the experiment: Grinding a sample that had a surface finish established with 30 $\mu$m grit slurry with 20 $\mu$m grit slurry; grinding this 20 $\mu$m grit established surface with 12 $\mu$m grit slurry; grinding this 12 $\mu$m grit established surface with 5 $\mu$m grit slurry; and polishing this 5 $\mu$m grit established surface.

TABLE 1

| Cycle | Surface Removal in $\mu$m between surface finishes | | | | |
|---|---|---|---|---|---|
| | Sample A | Sample B | Sample c | Sample D | Sample E |
| 30-20 | 213 | 185 | 190 | 211 | 199 |
| 20-12 | 78 | 71 | 64 | 85 | 64 |
| 12-5 | 56 | 46 | 36 | 44 | 46 |
| 5-polish | 19 | 19 | 99 | 100 | 87 |

In each case, the removal was at least 3 times the previous nominal grit size, ensuring that the surface finish was due only to the latest grit sized used.

Using linear regression analysis, estimates for the slopes and intercepts were obtained. These are summarized in the exemplary look-up table below:

| Grit used to establish Surface Finish | Contact Side | C(f) (ns) | Std. Dev. (ns) |
|---|---|---|---|
| 20 $\mu$m | R1 | −6.12 | .46 |
| | R2 | −7.34 | .35 |
| 12 $\mu$m | R1 | −5.39 | .38 |
| | R2 | −6.13 | .24 |
| 5 $\mu$m | R1 | −4.11 | .37 |
| | R2 | −4.76 | .27 |
| (polish) | R1 | −3.77 | .40 |
| | R2 | −3.59 | .40 |
| | R1&R2 | −3.68 | .26 |

These data indicate both a systematic bias and a surface finish dependent bias. They also indicate that the effect of surface finish is not the same when the surface is the front (first reflection) surface or the rear (second reflection) surface.

Figure 2:
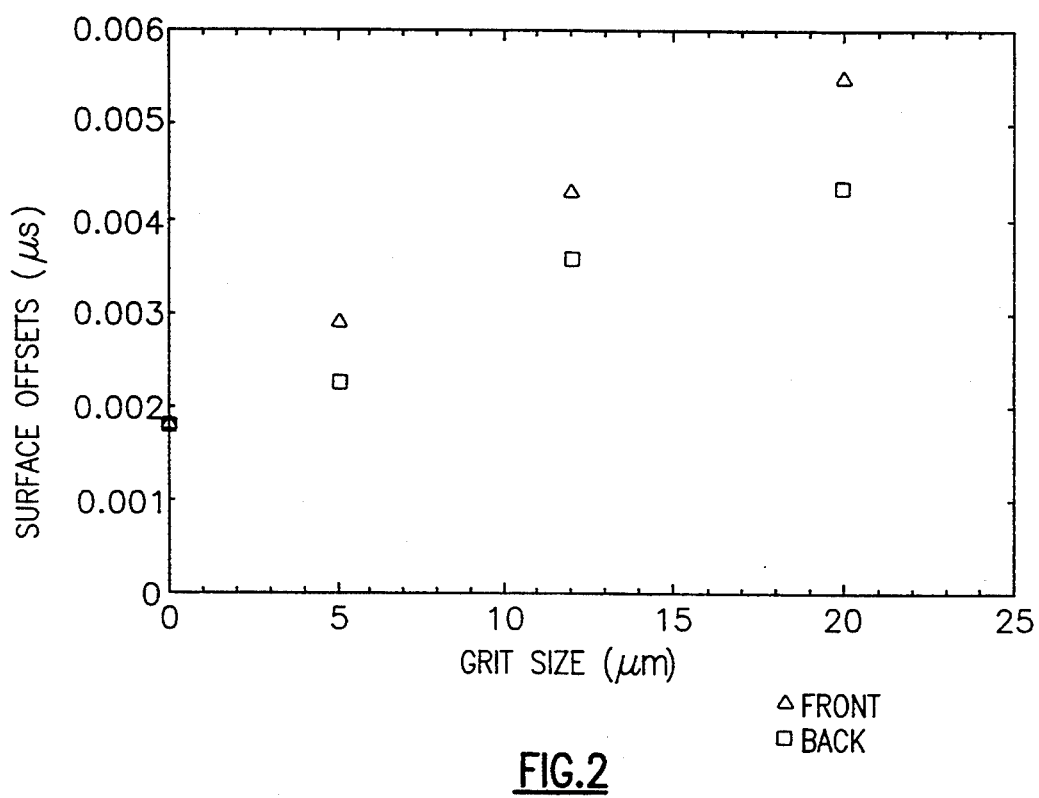
FIG. 2 shows a graph of surface finishing offsets in microseconds ($\mu s$) as a function of grit size which were used in the experiment.

These data are summarized in FIG. 2. The thickness equivalents of these time offsets are shown in FIG. 3.

Advantages of the Invention

The invention provides the technique to correct UTG measurements to attain precise correlation with mechanical measurements as a function of roughness of each (front and rear) surface (or the process which prepared each surface), the material measured, and the surface to which the instrument contacts for the measurement.

The invention provides the technique to quantify and compensate for measurement time biases and offsets and thus apply a correction to improve the measurement of sonic velocity in thin samples.

The invention applies UTG corrections to provide identical mechanical equivalent measurements with the UTG instrument in contact with either surface of the sample.

This invention permits the precise knowledge of material removal to provide a 95% confidence that certain minimum required glass removals are verifiable or verified.

This invention provide the best estimates of surface finish calibration files.

This invention provides the surface calibration files to attain the most accurate measurement of the velocity of sound of a sample (material or media).

The aforementioned embodiments described admirably achieve the objects of the invention; however, it will be appreciated that other arrangements and configuration can be made by those skilled in the are without departing form the spirit and scope of the invention which is deemed limited only by the appended clams and the reasonable interpretation thereof.

What is claimed is:

1. A method for measuring thickness of a sample of material having a front and rear surface each said front and rear surface having a finish in a time of flight system, comprising the steps of:

defining a surface dependent time offset C(f) which satisfies the function of $$t' = h' \div Va' + C(f),$$

wherein
- $t'$ = the measured time of flight of the calibration sample,
- $h'$ = the mechanically measured thickness of the calibration sample of material,
- $Va'$ = one half of the temperature corrected sonic velocity of the calibration sample of material, and
- $C(f)$ = the surface finish dependent time offset;

passing an actual ultrasonic wave with the velocity of sound (2Va) through the sample;

providing the surface finish dependent time offset (C(f)) calibrated for both front and rear surface finishes; and establishing a corrected thickness (CTM) as a function of the surface finish dependent time offset (C(f)) and a measured time of flight (t) which satisfies the condition:

$$CTM = Va \times (t - C(f)).$$

2. A method according to claim 1, wherein the surface finish dependent time offset calibrated for the surface finish of the material includes a front and back surface finish dependent time offset, wherein $$C(f) = \text{front offset} + \text{rear offset},$$

and $$CTM = Va\,(t - \text{front offset} - \text{rear offset})).$$

3. A method according to claim 1, wherein the ultrasonic wave passing step is performed with an ultrasonic thickness gauge.

4. A method according to claim 1, wherein the ultrasonic wave passed through the sample of material is performed with an ultrasonic thickness gauge.

5. A method according to claim 1, wherein the surface finish dependent time offset calibrated for the finish of the front surface, that is, a near side, and the rear surface, that is, a far side, are provided in a look-up table for either the variables of the type of material including glass, ceramics, metals, media, samples, and surface roughness or a process that prepared the surfaces such as grinding polishing, lapping.

6. A method according to claim 5, wherein an amount of material has been removed from the sample material in an operation including polishing, lapping, grinding is determined by a comparison of two corrected thickness measurements.

7. A method according to claim 6, wherein the amount of material is removed from a known shape by ultrasonic thickness gauge metrology and without other measurements.

8. A method according to claim 6, wherein the knowledge of the amount of material removal is required during and by operations that affect the surface finishes.

* * * * *